(12) United States Patent
Ko (10) Patent No.: US 9,723,101 B2
(45) Date of Patent: Aug. 1, 2017

(54) DEVICE AND METHOD FOR RECOMMENDING CONTENT BASED ON INTEREST INFORMATION

(71) Applicant: Samsung Electronics Co., Ltd., Gyeonggi-do (KR)

(72) Inventor: Ka Ram Ko, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 371 days.

(21) Appl. No.: 14/474,007

(22) Filed: Aug. 29, 2014

(65) Prior Publication Data

US 2015/0242427 A1     Aug. 27, 2015

(30) Foreign Application Priority Data

Feb. 21, 2014   (KR) .................. 10-2014-0020039

(51) Int. Cl.
   *G06F 17/30*    (2006.01)
   *H04L 29/08*    (2006.01)
   *H04L 29/06*    (2006.01)

(52) U.S. Cl.
   CPC ...... *H04L 67/306* (2013.01); *G06F 17/30029* (2013.01); *H04L 67/2833* (2013.01); *H04L 63/20* (2013.01); *H04L 67/26* (2013.01)

(58) Field of Classification Search
   None
   See application file for complete search history.

(56) References Cited

U.S. PATENT DOCUMENTS

| | | |
|---|---|---|
| 8,402,356 B2 | 3/2013 | Martinez et al. |
| 2005/0131762 A1 | 6/2005 | Bharat et al. |
| 2008/0117202 A1 | 5/2008 | Martinez et al. |
| 2009/0024452 A1 | 1/2009 | Martinez et al. |
| 2012/0271884 A1 | 10/2012 | Holmes et al. |
| 2013/0305287 A1* | 11/2013 | Wong .................... H04N 21/482 725/42 |
| 2015/0220528 A1* | 8/2015 | Huang ................ G06F 17/3007 707/728 |

FOREIGN PATENT DOCUMENTS

| | | |
|---|---|---|
| KR | 10-2011-0060714 | 6/2011 |
| KR | 10-2011-0118428 | 10/2011 |
| KR | 10-2013-0100853 | 9/2013 |
| KR | 10-2013-0105042 | 9/2013 |

* cited by examiner

Primary Examiner — Hung Q Pham (57) ABSTRACT

A content recommending device includes a storage module configured to store a user profile as security information and non-security information, and a control module configured to receive portions of first content corresponding to the non-security information from a plurality of content providing servers, and extract at least one portion of second content corresponding to the security information from the portions of first content to recommend the at least one portion of second content.

20 Claims, 6 Drawing Sheets

DEVICE AND METHOD FOR RECOMMENDING CONTENT BASED ON INTEREST INFORMATION

CROSS-REFERENCE TO RELATED APPLICATION(S) AND CLAIM OF PRIORITY

The present application is related to and claims the benefit under 35 U.S.C. §119(a) of a Korean patent application filed on Feb. 21, 2014 in the Korean Intellectual Property Office and assigned Serial No. 10-2014-0020039, the entire disclosure of which is hereby incorporated by reference.

TECHNICAL FIELD

Various embodiments of the present disclosure relate to a device and method for recommending content based on interest information of a user.

BACKGROUND

In general, both personal information of a user and content exist in a single system so that content based on user interest information is recommended to a user. Furthermore, in general, a content provider for providing content to a user stores personal information including user interest information.

According to a conventional device for recommending content based on user interest information, the device manages both personal information of a user and content, and thus, it may be difficult for the device to recommend various items of content according to interests of users.

Furthermore, according to the conventional device for recommending content based on user interest information, if the content recommendation is delegated to a content provider, the issue of personal information protection may occur.

SUMMARY

To address the above-discussed deficiencies, it is a primary object to provide a content recommending device and method based on interest information, according to which content may not be directly managed by the content recommending device and content may be received from a content provider.

Various embodiments of the present disclosure are directed to providing a content recommending device and method based on interest information, according to which a user profile may be generated and classified into multiple categories so that information that is not directly related to user personal information may be provided to a content provider and content corresponding to the information may be received from the content provider.

Various embodiments of the present disclosure are directed to providing a content recommending device and method based on interest information, according to which a user profile is generated and classified into multiple categories, and then, content corresponding to a profile of one category is received from a content provider, and the received content is extracted so as to correspond to a profile of the other category and the extracted content is recommended.

According to an embodiment of the present disclosure, a content recommending device includes: a storage module configured to store a user profile as security information and non-security information; and a control module configured to receive portions of first content corresponding to the non-security information from at least one content providing server, and extract at least one portion of second content corresponding to the security information from the portions of first content to recommend the at least one portion of second content.

According to an embodiment of the present disclosure, a content recommending method includes: storing a user profile for an electronic device as security information and non-security information by a control module; receiving portions of first content corresponding to the non-security information from at least one content providing server by the control module; and extracting at least one portion of second content corresponding to the security information from the portions of first content to recommend the at least one portion of second content to the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure will be described with reference to the accompanying drawings. The present disclosure may be variously modified and may include various embodiments. However, specific embodiments are exemplarily illustrated in the drawings and detailed descriptions related thereto are provided. However, it should be understood that the specific embodiments are not intended to limit the present disclosure to specific forms, but rather the present disclosure is meant to cover all modification, similarities, and alternatives which are included in the spirit and scope of the present disclosure. Like reference numerals refer to like elements.

The term "include," "comprise," "including," or "comprising" used herein indicates the presence of disclosed functions, operations, or elements but does not exclude other functions, operations or elements. It should be further understood that the term "include", "comprise", "have", "including", "comprising", or "having" used herein specifies the presence of stated features, integers, steps, operations, elements, components, or combinations thereof but does not preclude the presence or addition of one or more other features, integers, steps, operations, elements, components, or combinations thereof.

The meaning of the term "or" used herein includes any combination of the words connected by the term "or". For example, the expression "A or B" may indicate A, B, or both A and B.

The terms such as "first", "second", and the like used herein may refer to various elements of various embodiments, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It should be understood that when an element is referred to as being "connected" or "coupled" to another element, it can be directly connected or coupled to the other element or intervening elements may be present between the element and the other element. It should be further understood when an element is referred to as being "directly connected" or "directly coupled" to another element, there are no intervening elements between the element and the other element.

The terminology used herein is not for delimiting various embodiments of the present disclosure but for describing specific examples of the present disclosure. The terms of a singular form may include plural forms unless otherwise specified.

The terms used herein, including technical or scientific terms, have the same meanings as understood by those skilled in the art. It should be further understood that terms in common usage should also be interpreted as is customary in the relevant art and not in an idealized or overly formal sense unless expressly so defined herein.

Electronic devices according to various embodiments of the present disclosure may include communication functions. For example, the electronic devices may include at least one of smartphones, tablet personal computers (PCs), mobile phones, video telephones, electronic book readers, desktop PCs, laptop PCs, network computers, personal digital assistants (PDAs), portable multimedia players (PMPs), MP3 players, mobile medical devices, cameras, wearable devices (e.g., head-mounted-devices (HMDs) such as electronic glasses), electronic apparel, electronic bracelets, electronic necklaces, electronic accessories, electronic tattoos, and smart watches.

According to some embodiments, electronic devices may be smart home appliances having communication functions. The smart home appliances may include at least one of, for example, TVs, DVD players, audios, refrigerators, air conditioners, cleaners, ovens, microwave ovens, washing machines, air cleaners, set-top boxes, TV boxes (e.g., SAMSUNG HOMESYNC, APPLE TV, or GOOGLE TV), game consoles, electronic dictionaries, electronic keys, camcorders, and electronic picture frames.

According to some embodiments, electronic devices may include at least one of medical devices (e.g., magnetic resonance angiography (MRA), magnetic resonance imaging (MRI), computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), and points of sales (POSs).

According to some embodiments, electronic devices may include at least one of parts of furniture or buildings/structures having communication functions, electronic boards, electronic signature receiving devices, projectors, and measuring instruments (e.g., water meters, electricity meters, gas meters, and wave meters). Electronic devices according to various embodiments of the present disclosure may be one or more combinations of the above-mentioned devices. Furthermore, electronic devices according to various embodiments of the present disclosure may be flexible devices. In addition, it would be obvious to those skilled in the art that electronic devices according to various embodiments of the present disclosure are not limited to the above-mentioned devices.

Hereinafter, electronic devices according to various embodiments will be described with reference to the accompanying drawings. The term "user" used herein may refer to a person who uses an electronic device or a device (e.g., an artificial electronic device) that uses an electronic device.

Figure 1:
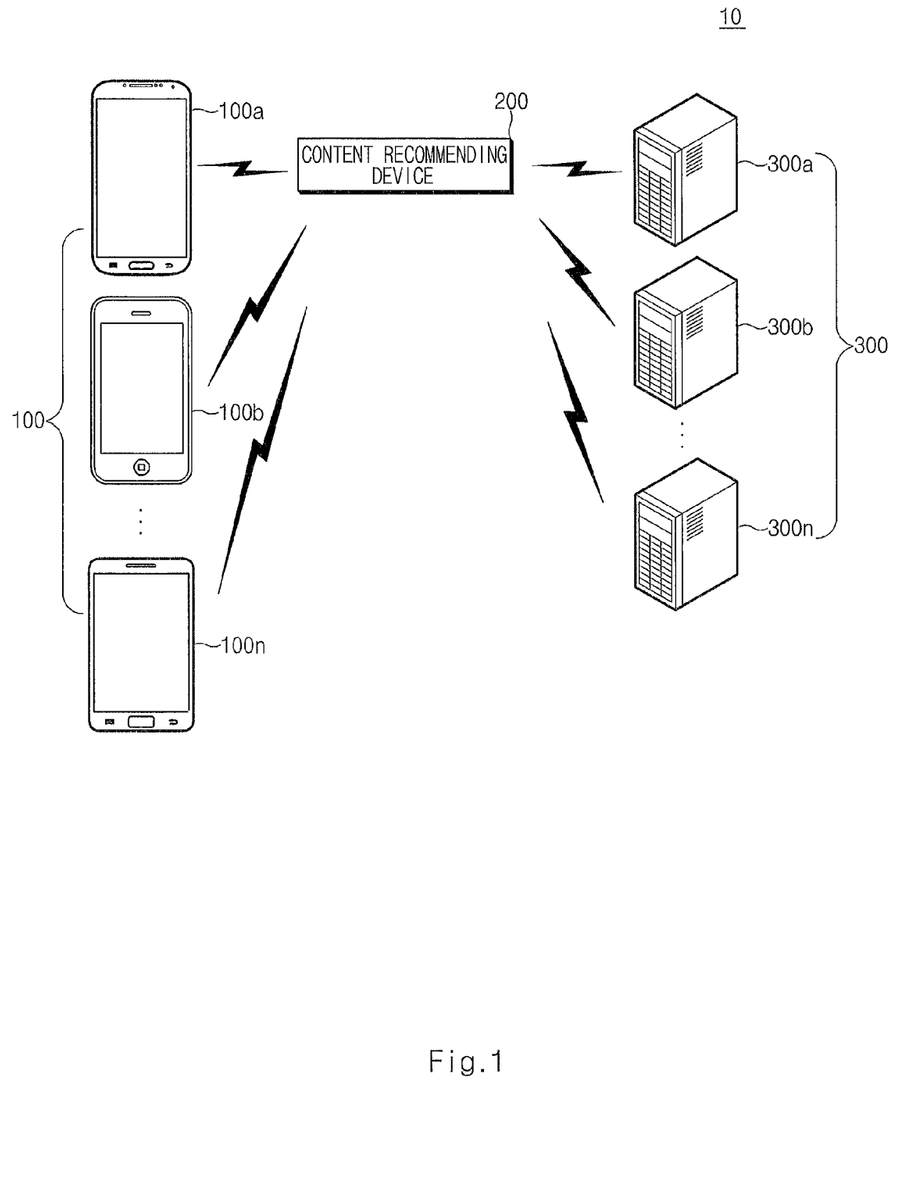
FIG. 1 is a diagram illustrating a content recommending system according to an embodiment of the present disclosure.

FIG. 1 is a diagram illustrating a content recommending system according to an embodiment of the present disclosure.

Referring to FIG. 1, a content recommending system 10 according to the present disclosure may include at least one user electronic device 100, a content recommending device 200, and at least one content providing server 300.

The user electronic device 100 may install a content recommending application to use a content recommending service provided by the content recommending device 200. The content recommending application may be downloaded by the user electronic device 100 from the content recommending device 200 so as to be installed, or may be pre-installed in the user electronic device 100.

The user electronic device 100 may execute the content recommending application according to an input from a user in order to perform logging in. The user electronic device 100 may execute the content recommending application according to an input from a user in order to perform logging in. The electronic device 100 may use an ID assigned to the user electronic device 100 when downloading the application, and thus may not perform member admission. For convenience, it is assumed that the electronic device 100 performs the member admission according to an embodiment of the present disclosure. The user electronic device 100 may provide user information which is used for the member admission to the content recommending device 200. Here, the user information may include a name, ID, password, phone number, age, marital status, existence of a child, or MAC address of a user.

The user electronic device 100 may include a communication module (not illustrated) for wireless communication including Wi-Fi communication, a GPS sensor (not illustrated), and a speed sensor (not illustrated). The communication module may receive a content list from the content recommending device 200, and may receive content recommended by the content recommending device 200. The GPS sensor may detect a current location of the user electronic device 100, and the speed sensor may detect a moving speed of the user electronic device 100. The user electronic device 100 may obtain the location information, the moving speed information, and weather information corresponding to the location information as real-time information.

When the application is executed, the user electronic device 100 may output a list of a plurality of portions of content, e.g., the content list, provided by the content providing server 300 through the content recommending device 200. The user electronic device 100 may transmit, to the content recommending device 200, a selection signal for selecting at least one portion of content from the content list according to an input from the outside. The user electronic device 100 may check the real-time information obtained when the content selection signal is input and may transmit the real-time information to the content recommending device 200.

The user electronic device 100 may receive content corresponding to the selection signal from the content recommending device 200 and may output the received content. When a feedback signal for the content is input from the outside, the user electronic device 100 may transmit the feedback signal to the content recommending device 200. Here, the feedback signal may represent comment preparation, recommendation to another user, and sharing through an SNS account with respect to the content.

After the user electronic device 100 checks the content corresponding to the selection signal as described above, the user electronic device 100 may receive a recommendation on at least one portion of content from the content recommending device 200. Here, with respect to the user electronic device 100, the content may be user content set by a user, content for which the content selection signal has been input, or content corresponding to the real-time information. In addition, optionally, the recommendation on content may be received on the basis of content for which the feedback signal has been input. The user electronic device 100 may receive the recommendation on content when re-executing the application, or may receive the recommendation on content in real time or periodically from the application. Here, the content may be about various types of information such as coupon information, travel destination information, restaurant information, route information, recipe information, makeup information, and coordination information, and may have a format of multimedia data or document data.

The content recommending device 200 may classify a user profile into security information and non-security information to store the user profile. The content recommending device 200 may receive portions of first content corresponding to the non-security information from a plurality of content providing servers 300, and may extract at least one portion of second content corresponding to the security information from the portions of first content to recommend the extracted content to the user electronic device 100. Here, the user profile may be generated on the basis of the user information provided from the user electronic device 100, history information corresponding to the content selection signal, and the real-time information of the user electronic device 100. The content recommending device 200 may set a suggested term such as "trend leader", "shoeaholic", "traveling gourmet", "likes walking", and "frequent use of Wi-Fi".

The content recommending device 200 may provide the content recommending application to the user electronic device 100, and may collect the user information through a member admission procedure before the content recommending application is used in the user electronic device 100. Here, the user information may include private information of a user, such as a name, ID, password, phone number, age, marital status, existence of a child, and MAC address. The content recommending device 200 may receive a plurality of portions of content from the content providing server 300, and may generate the content list corresponding to the received portions of content to transmit the content list to the user electronic device 100.

When the selection signal for selecting at least one portion of content from the content list is input from the user electronic device 100, the content recommending device 200 may extract content corresponding to the selection signal to transmit the extracted content to the user electronic device 100. The content recommending device 200 may receive the real-time information checked by the user electronic device 100 when receiving the selection signal, and may generate the history information on the content transmitted to the user electronic device 100. The content recommending device 200 may generate the user profile using the user information, the history information, and the real-time information of the user electronic device 100. Here, the content recommending device 20 may generate the user profile on the basis of a feedback signal, upon receiving the feedback signal from the user electronic device 100.

After the user profile is generated, the content recommending device 200 may recommend content corresponding to the user profile to the user electronic device 100. According to an embodiment, the content recommending device 200 may classify the user profile into security information and non-security information to store the user profile. Here, the security information may be user's personal information that may need to be protected, such as a name, ID, password, phone number, age, marital status, existence of a child, and MAC address, and the non-security information may be information other than the personal information. The history information and the real-time information may be classified into one of the security information and the non-security information.

The content recommending device 200 may transmit the non-security information to the content providing server 300. The content providing server 300 may extract the first content from a plurality of portions of content on the basis of the non-security information to transmit the extracted first content to the content recommending device 200. The content recommending device 200 may extract the second content corresponding to the security information from the first content, and may recommend the extracted second content to the user electronic device 100. The content recommending device 200 may receive, from the user electronic device 100, the selection signal for selecting a portion of content from among portions of the second content recommended to the user electronic device 100, and may receive the real-time information obtained when the selection signal is received. The content recommending device 200 may update the user profile using the history information and real-time information corresponding to the selection signal. In this manner, the content recommending device 200 may continuously recommend content to the user electronic device 100, and may continuously update the user profile according to whether recommended content is selected. Accordingly, an interest of a user may be more clearly discovered, and content that more correctly matches the user interest may be recommended.

The content providing server 300 may extract the first content from a plurality of portions of content using a built-in recommendation logic according to the non-security information received from the content recommending device 200, and may transmit the extracted first content to the content recommending device 200. According to an embodiment, the content providing server 300 may receive, from the content recommending device 200, a suggested term for classifying content. The content providing server 300 may classify content according to the provided suggested term. The content providing server 300 may extract content mapped to a suggested term similar to the non-security information received from the content recommending device 200 as the first content in order to provide the first content to the content recommending device 200. For example, the content providing server 300 may store content about various types of information such as coupon information, travel destination information, restaurant information, route information, recipe information, makeup information, and coordination information, wherein the content may be provided to the content recommending device 200 and the user electronic device 100 in the form of multimedia data or document data. The content providing server 300 may receive, from the content recommending device 200, various suggested terms such as "trend leader", "shoeaholic", "traveling gourmet", "likes walking", and "frequent use of Wi-Fi". The above-mentioned portions of content may be mapped to the various suggested terms so as to be stored.

Figure 2:
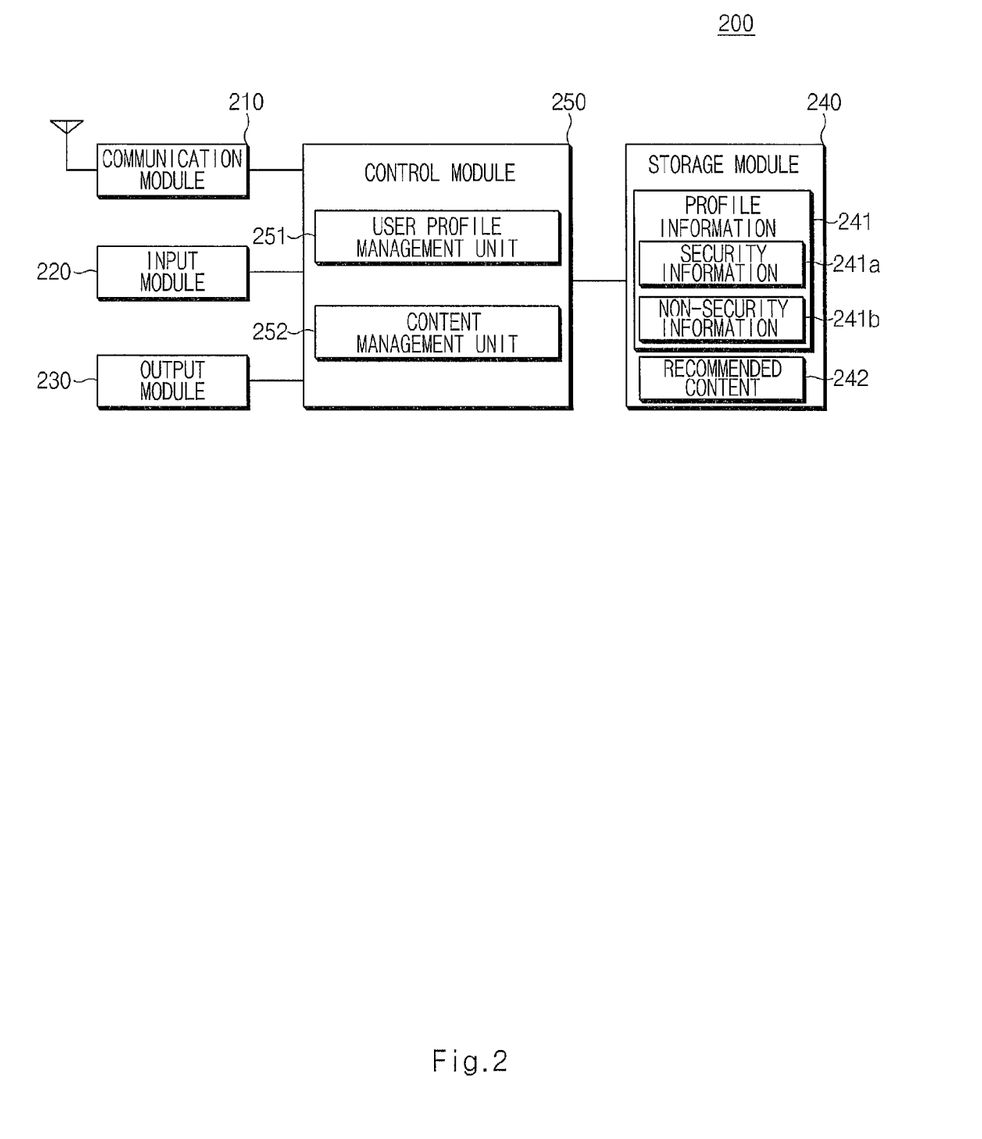
FIG. 2 is a block diagram illustrating a configuration of a content recommending device according to an embodiment of the present disclosure.

FIG. 2 is a block diagram illustrating a configuration of the content recommending device according to an embodiment of the present disclosure.

Referring to FIGS. 1 and 2, the content recommending device 200 according to the present disclosure may include a communication module 210, an input module 220, an output module 230, a storage module 240, and a control module 250. The storage module 240 may include profile information 241 and recommended content 242, wherein the profile information 241 may include security information 241a and non-security information 241b. The control module 250 may include a user profile management unit 251 and a content management unit 252.

The communication module 210 may enable communication between the user electronic device 100 and the content providing server 300. For example, the communication module 210 may communicate with the user electronic device 100 and the content providing server 300 by wire or wirelessly. The communication by wire may be performed through a universal serial bus (USB), high definition multimedia interface (HDMI), recommended standard 232 (RS-232), or plain old telephone service (POTS). The wireless communication may be performed through wireless fidelity (Wi-Fi), Bluetooth (BT), near field communication (NFC), or cellular communication technology (e.g., LTE, LTE-A, CDMA, WCDMA, UMTS, WiBro, or GSM). The communication module 210 may be controlled by the control module 250 so as to transmit a preset suggested term to the content providing server 300. The communication module 210 may provide the content recommending application to the user electronic device 100, and may receive the user information from the user electronic device 100. The communication module 210 may transmit the content list to the user electronic device 100, and may receive the selection signal for selecting at least one portion of content from the content list. The communication module 210 may receive the real-time information from the user electronic device 100. The communication module 210 may receive the feedback signal for the content provided to the user electronic device 100. The communication module 210 may be controlled by the control module 250 so as to transmit the non-security information in the user profile to the content providing server 300. The communication module 210 may receive the first content from the content providing server 300. According to control by the control module 250, the communication module 210 may transmit the second content extracted from the first content to the user electronic device 100.

The input module 220 may generate an operation signal for operating the content recommending device 200 according to an input from the outside, and may transmit the operation signal to the control module 250. The input module 220 may generate a recommendation information input signal to be transmitted to the content providing server 300. The input module 220 may include an input device such as a key button, a keyboard, a keypad, a touchpad, or a touch screen.

The output module 230 may display an execution screen operated according to control by the control module 250. The output module 230 may include a liquid crystal display (LCD) or a touch screen. In the case of using the touch screen, the output module 230 may also perform an operation of the input module 220. The output module 230 may display recommendation information according to the input signal generated by the input module 220, and may display the personal information and the symbol information received from the user electronic device 100. The output module 230 may display the real-time information received from the user electronic device 100.

The storage module 240 may store a program or application for operating the content recommending device 200. The storage module 240 may store the user profile in the profile information 241. Here, the user profile may be generated using the user information and real-time information from the user electronic device 100 and the history information on the content corresponding to the content selection signal received from the user electronic device 100. Furthermore, the history information on content corresponding to the feedback signal for the content transmitted to the user electronic device 100 may be included. The storage module 240 may classify the user profile stored in the profile information 241 into the security information and the non-security information to store the security information and the non-security information as the security information 241a and the non-security information 241b respectively. Here, the security information may be user's personal information that may need to be protected, such as a name, ID, password, phone number, age, marital status, existence of a child, and MAC address, and the non-security information may be information other than the security information in the user profile. The history information and the real-time information may be classified into one of the security information and the non-security information.

The storage module 240 may temporarily store the first content received from the content providing server 300 in the recommended content 242. The first content stored in the recommended content 242 may be deleted after the second content is extracted from the control module 250.

The user profile management unit 251 of the control module 250 may check the user information of the user electronic device 100, upon receiving a request signal for recommending content from the user electronic device 100. The user information may include personal information and interest information. The user information may include a name, ID, password, phone number, age, marital status, existence of a child, and MAC address of a user, and the interest information may be information extracted from the personal information, such as a user age and gender.

The content management unit 252 may generate a list of a plurality of portions of content received from the content providing server 300, and may transmit the content list to the user electronic device 100. When the selection signal for selecting at least one portion of content from the content list is received from the user electronic device 100, the user profile management unit 251 may generate history information from the selection signal. The user profile management unit 251 may collect the real-time information received from the user electronic device 100, when receiving the selection signal. The user profile management unit 251 may receive a feedback signal for specific content from the user electronic device 100.

The user profile management unit 251 may generate the user profile using the user information, the history information, and the real-time information. Here, the user profile management unit 251 may generate the user profile when the feedback signal is received, or may generate the user profile regardless of the reception of the feedback signal.

The user profile management unit 251 may store the generated user profile in the profile information 241. The user profile management unit 251 may classify the user profile into the security information and the non-security information. The user profile management unit 251 may store the security information in the security information 241a of the storage module 240, and may store the non-security information in the non-security information 241b of the storage module 240.

When the user electronic device 100 corresponding to the generated user profile is connected, the user profile management unit 251 may transmit the non-security information to the content providing server 300. The content management unit 252 may receive the first content from the content providing server 300. Here, the first content may correspond to the non-security information. The content management unit 252 may extract the second content from the received first content using the security information. The content management unit 252 may transmit the extracted second content to the user electronic device 100. When a selection signal for the second content is received, the user profile management unit 251 may update the user profile using the history information on the second content and the real-time information received when the selection signal is received.

Figure 3:
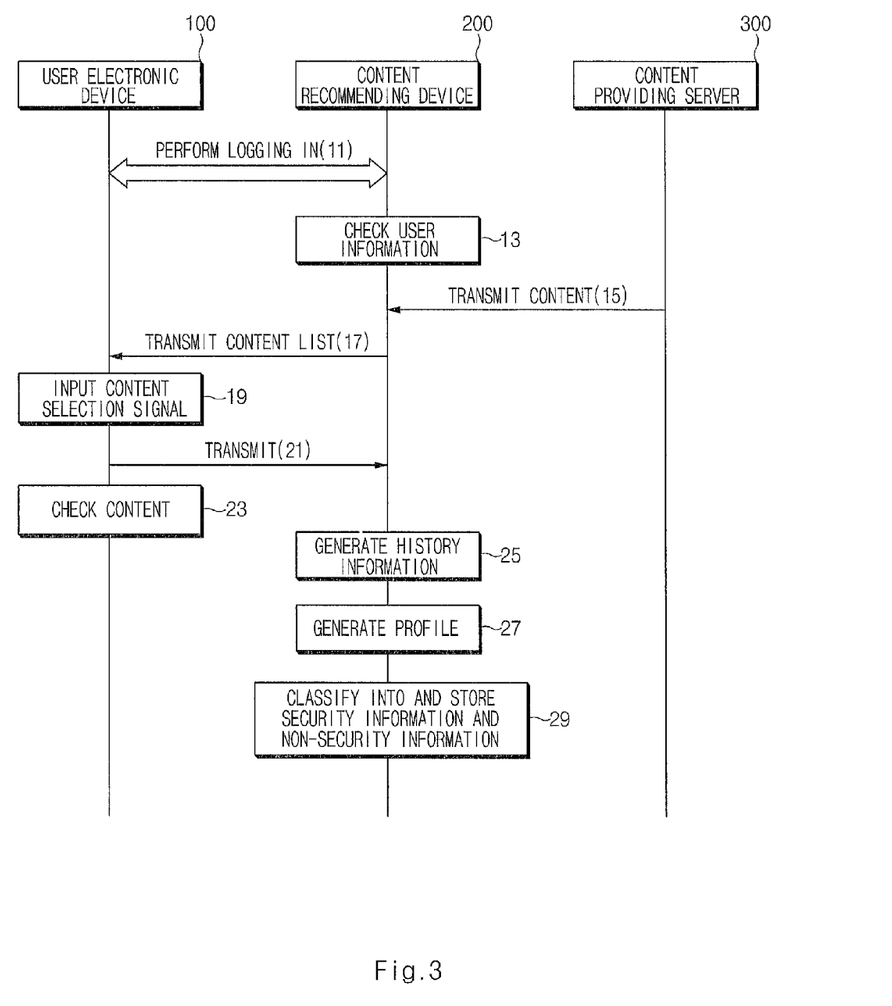
FIG. 3 is a flowchart illustrating a method for generating a user profile in a content recommending system according to an embodiment of the present disclosure.

FIG. 3 is a flowchart illustrating a method for generating the user profile according to an embodiment of the present disclosure.

Referring to FIGS. 1 to 3, in operation 11, the user electronic device 100 may be connected to the content recommending device 200 in order to performing logging in. Here, the user electronic device 100 may download an application from the content recommending device 200 to perform logging in through member admission, or may perform logging in using an ID assigned to the user electronic device 100 when the application is downloaded.

In operation 13, the content recommending device 200 may check the user information of the user electronic device 100 that has logged in. Here, the user information checked by the content recommending device 200 may be the personal information and interest information received from the user electronic device 100. Here, the user information may include a name, ID, password, phone number, age, marital status, existence of a child, and MAC address of a user, and the interest information may be information extracted from the personal information, such as a user age and gender.

In operation 15, the content providing server 300 may transmit a plurality of portions of pre-stored content to the content recommending device 200, and, in operation 17, the content recommending device 200 may generate the content list for the plurality of portions of received content to transmit the content list to the user electronic device 100. In operation 19, the user electronic device 100 may input a selection signal for selecting at least one portion of content from the content list, and, in operation 21, the user electronic device 100 may transmit the selection signal to the content recommending device 200. Here, the user electronic device 100 may transmit, to the content recommending device 200, the real-time information of the user electronic device 100 checked when the selection signal is transmitted. Here, the real-time information may include a location and moving speed of the user electronic device 100 and weather information corresponding to the location. In operation 23, the user electronic device 100 may check content corresponding to the selection signal.

In operation 25, the content recommending device 200 may generate content history information on the basis of the content selection signal. Here, the history information may include a plurality of suggested terms preset by the content recommending device 200.

In operation 27, the content recommending device 200 may generate the user profile using the user information, the history information, and the real-time information. The content recommending device 200 may receive, from the user electronic device 100, a feedback signal for the content transmitted to the user electronic device 100. The content recommending device 200 may generate the user profile according to whether the feedback signal is received. However, in the present disclosure, it is assumed that the user profile is generated even through the feedback signal is not received.

In operation 29, the content recommending device 200 may classify the generated user profile into the security information and the non-security information to store the user profile. Here, the security information may include personal information of user information, and the non-security information may include information collected to generate the user profile, excepting the security information. The history information and the real-time information may be selectively included in the security information or the non-security information.

Figure 4:
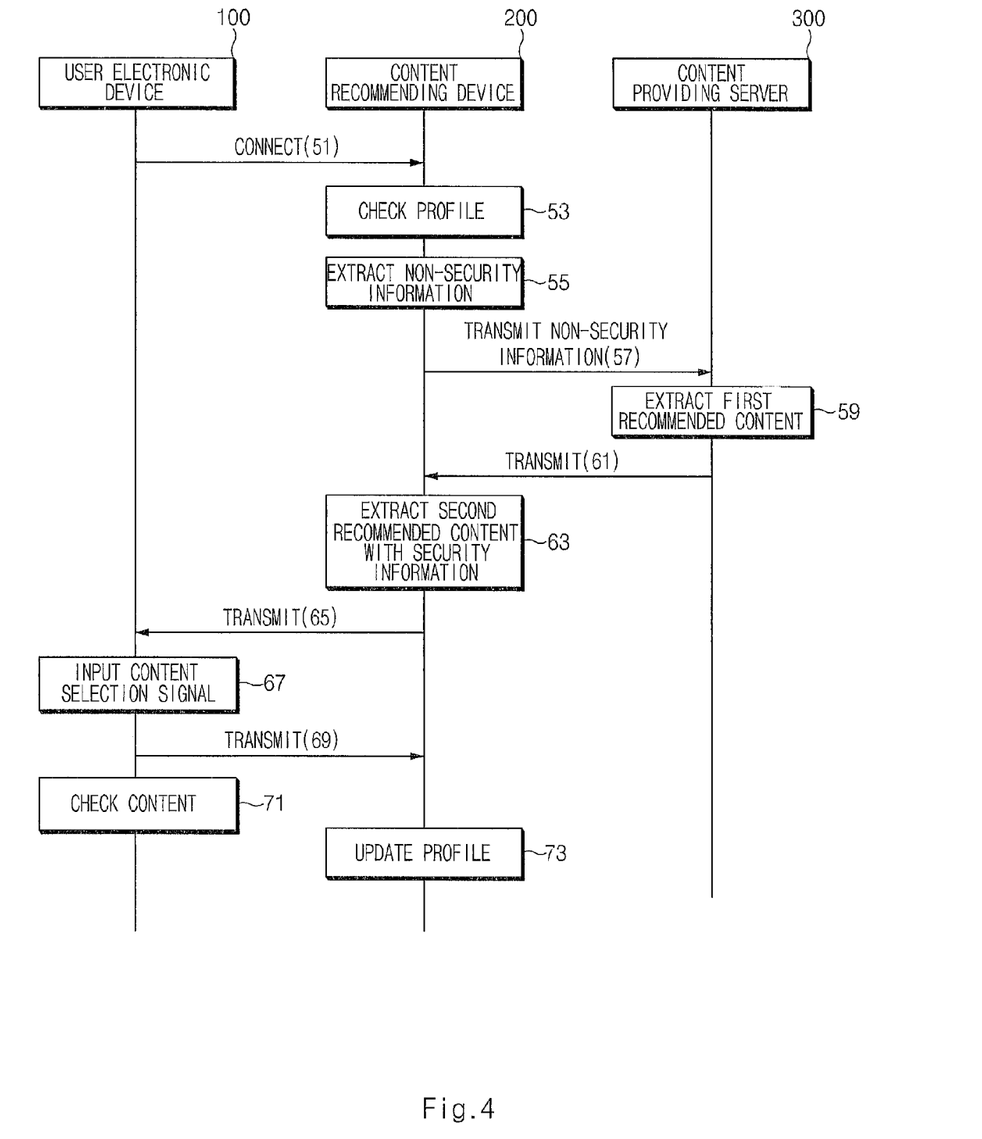
FIG. 4 is a flowchart illustrating a method for recommending, by a content recommending system, content according to an embodiment of the present disclosure.

FIG. 4 is a flowchart illustrating a content recommending method according to an embodiment of the present disclosure.

Referring to FIGS. 1 to 4, in operation 51, the user electronic device 100 may be connected to the content recommending device 200. In operation 53, the content recommending device 200 may check the user profile generated in operation 27 of FIG. 3, and, in operation 55, the content recommending device 200 may extract the non-security information classified from the user profile. In operation 57, the content recommending device 200 may transmit the non-security information to the content providing server 300.

In operation 59, the content providing server 300 may extract the first content on the basis of the non-security information. In operation 61, the content providing server 300 may transmit the extracted first content to the content recommending device 200.

In operation 63, the content recommending device 200 may extract the second content from the first content using the security information. In operation 65, the content recommending device 200 may transmit the extracted second content to the user electronic device 100.

In operation 67, the user electronic device 100 may input a selection signal for selecting at least one portion of content from the second content, and, in operation 69, the user electronic device 100 may transmit the selection signal to the content recommending device 200. In operation 71, the user electronic device 100 may check content corresponding to the selection signal.

In operation 73, the content recommending device 200 may update the history information generated in operation 25 of FIG. 3 and the user profile generated in operation 27 on the basis of the selection signal received in operation 69.

Although it has been described that the reception of the first content and the transmission of the second content are performed when the connection of the user electronic device 100 is confirmed, the present disclosure is not limited thereto. For example, the control module 250 may perform the reception of the first content and the transmission of the second content when a period set by the user electronic device 100 expires. Furthermore, when the first content corresponding to the user profile is received from the content providing server 300, the control module 250 may extract the second content in real time and may transmit the extracted second content to the user electronic device 100.

Figure 5:
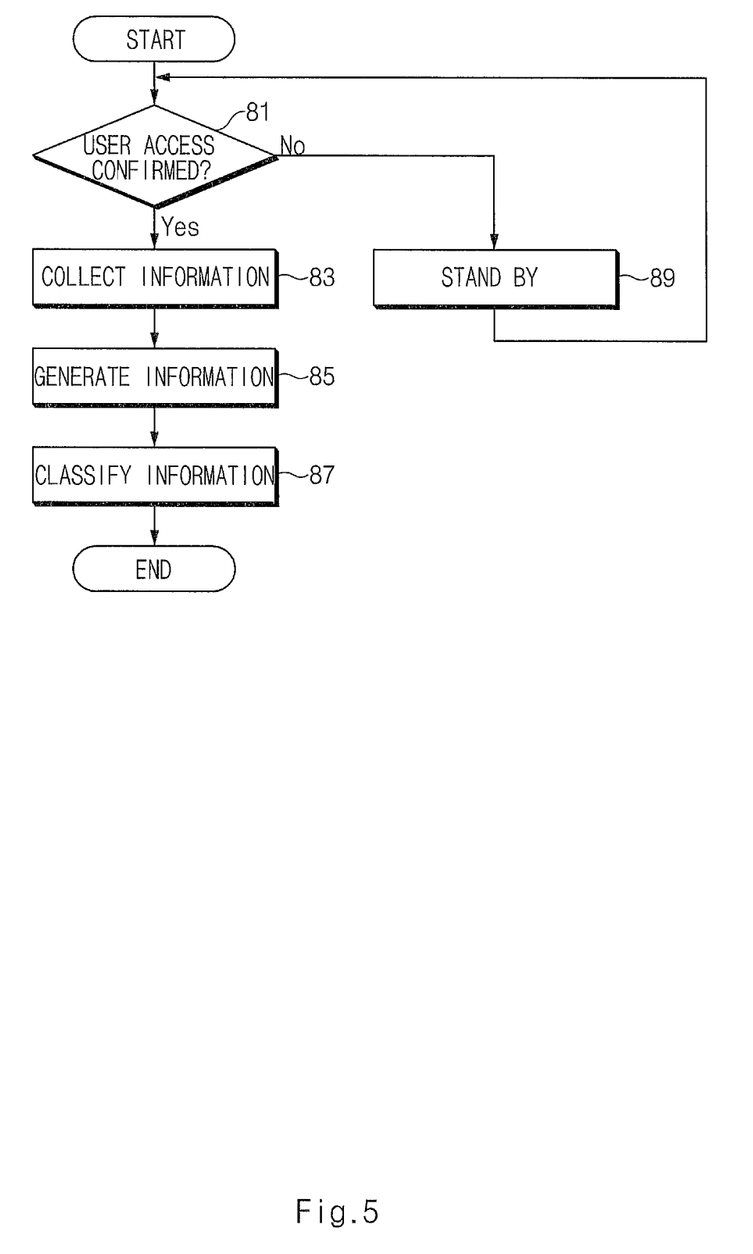
FIG. 5 is a flowchart illustrating a method for generating, by a content recommending device, a user profile according to an embodiment of the present disclosure.

FIG. 5 is a flowchart illustrating a method for generating, by the content recommending device, the user profile according to an embodiment of the present disclosure.

Referring to FIGS. 1, 2 and 5, in operation 81, the control module 250 may check whether the user electronic device 100 is connected. If it is confirmed that the user electronic device 100 is connected in operation 81, the control module 250 may perform operation 83, or, if it is not confirmed that the user electronic device 100 is connected, the control module 250 may perform operation 89. In operation 89, the control module 250 may stand by for the connection of the user electronic device 100 to return to operation 81.

In operation 83, the control module 250 may collect information for recommending content. Here, the collected information may be the user information, the history information, and the real-time information. According to an embodiment, the control module 250 may collect the user information received from the user electronic device 100 when the user electronic device 100 performs member admission and logging in using the content recommending application. The user information may be the personal information and interest information received from the user electronic device 100. Here, the user information may include a name, ID, password, phone number, age, marital status, existence of a child, and MAC address of a user, and the interest information may be information extracted from the personal information, such as a user age and gender.

According to an embodiment, the control module 250 may generate a list of a plurality of portions of content received from the content providing server 300, and may transmit the content list to the user electronic device 100 through an application. The control module 250 may transmit, to the user electronic device 100, content corresponding to the selection signal received from the user electronic device 100, and may collect the history information on the content. Here, the history information may include a preset suggested term such as "trend leader", "shoeaholic", "traveling gourmet", "likes walking", and "frequent use of Wi-Fi". For example, when the suggested term set for the content corresponding to the history information is "traveling gourmet", the control module 250 may expect that a user of the user electronic device 100 is interested in, for example, a restaurant, travel destination, map, fishing, hiking, running shoes, and outdoor clothes.

According to an embodiment, the control module 250 may collect the real-time information received from the user electronic device 100 when the selection signal is received from the user electronic device 100. Here, the real-time information may include a location and moving speed of the user electronic device 100 and weather information corresponding to the location. In addition, the control module 250 may receive, from the user electronic device 100, a feedback signal for the content transmitted to the user electronic device 100.

In operation 85, the control module 250 may generate the user profile using the collected information. Here, the control module 250 may determine whether to generate the user profile according to whether the feedback signal is received from the user electronic device 100. However, in the present disclosure, it is assumed that the user profile is generated even through the feedback signal is not received.

For example, when the suggested term "traveling gourmet" is mapped to the content selected by a user from among a plurality of portions of content provided to the user electronic device 100 by the control module 250, the control module 250 may transmit portions of content for the suggested term to the user electronic device 100. The control module 250 may receive the real-time information from the user electronic device 100 when receiving the selection signal. Here, the control module 250 may generate the profile using the content transmitted to the user electronic device 100 as history information. When it is confirmed that a time at which the selection signal is input is 12 to 2 p.m. every afternoon and it is confirmed that a location where the input of the selection signal is performed is Seocho-gu, the control module 250 may generate the profile using the time and the location as real-time information. Here, the control module 250 may detect a more specific current location of the electronic device 100 in units of Gu, Dong, and house number.

In operation 87, the control module 250 may classify the generated user profile into the security information and the non-security information to store the user profile. Here, the security information may include personal information of user information, and the non-security information may include information collected to generate the user profile, excepting the security information. The history information and the real-time information may be selectively included in the security information or the non-security information. For example, the control module 250 may classify the user personal information and location-related information of the real-time information, contained in the user profile generated by the control module 250 in operation 85, as the security information. The control module 250 may classify the interest information and visual information of the real-time information as the non-security information.

Figure 6:
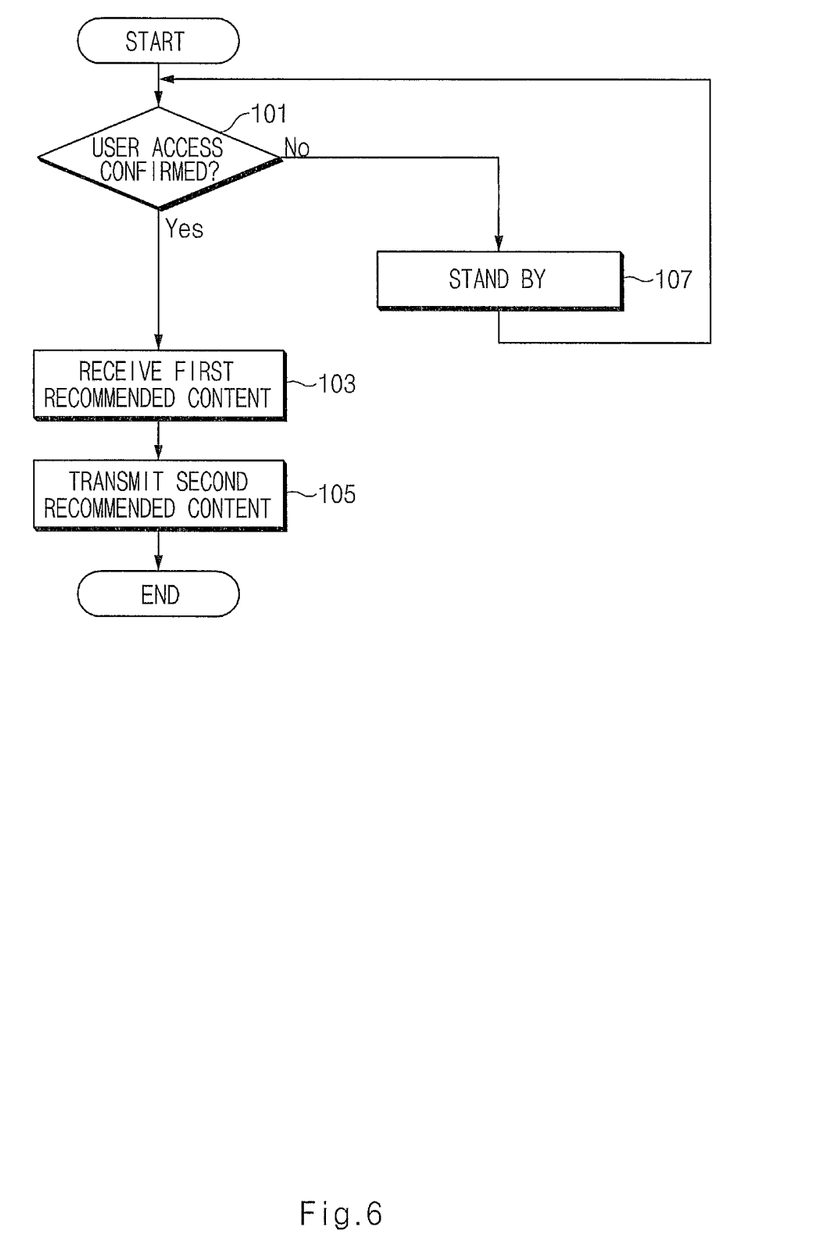
FIG. 6 is a flowchart illustrating a method for recommending, by a content recommending device, content according to an embodiment of the present disclosure.

FIG. 6 is a flowchart illustrating a method for recommending, by the content recommending device, content according to an embodiment of the present disclosure.

Referring to FIGS. 1, 2, 5 and 6, in operation 101, the control module 250 may check whether the user electronic device 100 is connected. If it is confirmed that the user electronic device 100 is connected in operation 101, the control module 250 may perform operation 103, or, if it is not confirmed that the user electronic device 100 is connected, the control module 250 may perform operation 107. In operation 107, the control module 250 may stand by for the connection of the user electronic device 100 to return to operation 101.

In operation 103, the control module 103 may receive the first content from the content providing server 300. According to an embodiment, the control module 250 may transmit the non-security information classified from the user profile in operation 87 of FIG. 5 to the content providing server 300, and may receive the first content corresponding to the non-security information from the content providing server 300.

In operation 105, the control module 250 may extract the second content from the first content. The control module 250 may transmit the extracted second content to the user electronic device 100 so as to recommend content corresponding to an interest of a user.

For example, the control module 250 may transmit the interest information, the history information, and the visual information of the real-time information, classified as the non-security information in operation 87 of FIG. 5, to the content providing server 300. Here, the content providing server 300 may extract portions of content corresponding to the suggested term "traveling gourmet". The content providing server 300 may extract, from the extracted portions of content, content about a menu for eating out suitable for lunch and content about recipe for lunch, which may be inferred from the visual information, as the first content, and may transmit the first content to the content recommending device 200. The control module 250 may extract the second content from the first content on the basis of the security information, and may transmit the extracted second content to the user electronic device 100. For example, since the control module 250 sets the location-related information of the real-time information as the security information in operation 87 of FIG. 5, the control module 250 may extract content about Seocho-gu corresponding to the location information from the first content as the second content so as to transmit the second content to the user electronic device 100. Furthermore, when the selection signal for selecting a portion of content from the second content and the real-time information are input from the user electronic device 100, the control module 250 may update the history information to thereby update the user profile. Accordingly, as a user uses a recommended content service more frequently, the user profile becomes more specific, so that the user may receive a recommendation on content suitable for an interest of the user.

Although it has been described that the reception of the first content and the transmission of the second content are performed when the connection of the user electronic device 100 is confirmed, the present disclosure is not limited thereto. For example, the control module 250 may perform the reception of the first content and the transmission of the second content when a period set by the user electronic device 100 expires. Furthermore, when the first content corresponding to the user profile is received from the content providing server 300, the control module 250 may extract the second content in real time and may transmit the extracted second content to the user electronic device 100.

Each of the above-mentioned elements of the electronic device, according to the present disclosure, may be configured with one or more components, and the names of the elements may be changed according to the type of the electronic device. The electronic device according to the present disclosure may include at least one of the above-mentioned elements, and some elements may be omitted or other additional elements may be added. Furthermore, some of the elements of the electronic device according to the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component", "circuit", and "circuitry". The "module" may be a minimum unit of an integrated component or may be a part thereof. The "module" may be a minimum unit for performing one or more functions or a part thereof. The "module" may be implemented mechanically or electronically. For example, the "module" according to the present disclosure may include at least one of an application-specific integrated circuit (ASIC) chip, a field-programmable gate array (FPGA), and a programmable-logic device for performing some operations, which are known or will be developed.

According to various embodiments, at least a part of devices (e.g., modules or functions thereof) or methods (e.g., operations) according to the present disclosure may be implemented as instructions stored in a computer-readable storage medium in the form of a programming module. In the case where the instructions are performed by at least one processor, the at least one processor may perform functions corresponding to the instructions. The computer-readable storage medium may be, for example, a memory. At least a part of the programming module may be implemented (e.g., executed) by a processor. At least a part of the programming module may include, for example, a module, program, routine, sets of instructions, or process for performing at least one function.

The computer-readable storage medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and a hardware device configured to store and execute program instructions (e.g., programming module), such as a read only memory (RAM), a random access memory (RAM) and a flash memory. The program instructions may include machine language codes made by compilers and high-level language codes that can be executed by computers using interpreters. The above-mentioned hardware may be configured to be operated as one or more software modules for performing operations of the present disclosure and vice versa.

The module or programming module according to the present disclosure may include at least one of the above-mentioned elements, or some elements may be omitted or other additional elements may be added. Operations performed by the module, the programming module or the other elements may be performed in a sequential, parallel, iterative, or heuristic way. Furthermore, some operations may be performed in another order or may be omitted, or other operations may be added.

As described above, according to the content recommending device and method according to various embodiments of the present disclosure, content is not directly managed by the content recommending device, and content is received from the content provider so as to be recommended. Therefore, various portions of content according to interests of users may be recommended.

Furthermore, according to the content recommending device and method according to various embodiments of the present disclosure, the user profile is classified into multiple categories so that information that is not directly related to user personal information is provided to the content provider and content corresponding to the information is received from the content provider, thereby protecting user's personal information.

Moreover, according to the content recommending device and method according to various embodiments of the present disclosure, the user profile is generated and classified into multiple categories, and then, content corresponding to a profile of one category is received from the content provider, and the received content is extracted so as to correspond to a profile of the other category and the extracted content is recommended. Therefore, content similar to user interest information may be recommended.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A content recommending device comprising:
a storage module configured to store a user profile as security information and non-security information; and
a control module configured to:
extract the non-security information from the user profile;
transmit the non-security information to a content providing server;
receive a first content extracted by and transmitted from the content providing server, the first content corresponding to the non-security information;
extract a second content corresponding to the security information from the first content; and
transmit the second content to a user electronic device.

2. The content recommending device according to claim 1, wherein the control module is configured to provide a list of at least one portion of content received from the content providing server to an electronic device when the electronic device is connected.

3. The content recommending device according to claim 2, wherein the control module is configured to provide content corresponding to a selection signal received from the electronic device for selecting at least one portion of content from the content list to the electronic device, and generate history information on the content.

4. The content recommending device according to claim 3, wherein the control module is configured to check real-time information when receiving the selection signal from the electronic device.

5. The content recommending device according to claim 4, wherein the control module is configured to generate the user profile from user information received from the electronic device, the history information, and the real-time information.

6. The content recommending device according to claim 5, wherein the user information includes at least one of a name, ID, password, phone number, age, marital status, existence of a child, and MAC address of a user.

7. The content recommending device according to claim 2, wherein the control module is configured to recommend the second content to the electronic device when the electronic device is connected, or recommend the second content to the electronic device periodically or in real time.

8. A content recommending method comprising:
storing, by a control module, a user profile for an electronic device as security information and non-security information;
extracting the non-security information from the user profile;
transmitting the non-security information to a content providing server;
receiving, by the control module, a first content extracted and transmitted from the content providing server, the first content corresponding to the non-security information;
extracting, by the control module, a second content corresponding to the security information from the first content; and
transmitting the second content to a user electronic device.

9. The content recommending method according to claim 8, further comprising generating, by the control module, the user profile.

10. The content recommending method according to claim 9, wherein generating the user profile comprises generating, by the control module, the user profile from user information received from the electronic device, history information on content selected by the electronic device, and real-time information received from the electronic device when the content is selected.

11. The content recommending method according to claim 10, further comprising receiving, by the control module, the user information associated with at least one of a name, ID, password, phone number, age, marital status, existence of a child, and MAC address of a user.

12. The content recommending method according to claim 8, wherein extracting at least one portion of second content comprises extracting, by the control module, the second content when a selection signal corresponding to at least one portion of the first content is received from the electronic device and recommending the extracted second content to the electronic device.

13. The content recommending method according to claim 8, wherein extracting at least one portion of second content comprises extracting, by the control module, the second content periodically or in real time and recommending the extracted second content to the electronic device.

14. The content recommending method according to claim 10, further comprising updating, by the control module, the user profile using at least one of history information on content selected from the second content by the electronic device and real-time information received from the electronic device when the content is selected.

15. A content recommending system comprising:
an electronic device;
at least one content providing server; and
a content recommending device configured to:
store a user profile as security information and non-security information in a storage module;
extract the non-security information from the user profile;
transmit the non-security information to a content providing server;

receive a first content extracted and transmitted from the content providing server, the first content corresponding to the non-security information
extract a second content corresponding to the security information from the first content; and
transmit the second content to a user electronic device.

16. The content recommending system according to claim 15, wherein the content recommending device is configured to provide a list of at least one portion of content received from the at least one content providing server to the electronic device when the electronic device is connected.

17. The content recommending system according to claim 16, wherein the content recommending device is configured to provide content corresponding to a selection signal for selecting at least one portion of content from the content list received from the electronic device to the electronic device, and generate history information on the content.

18. The content recommending system according to claim 17, wherein the content recommending device is configured to check real-time information when receiving the selection signal from the electronic device.

19. The content recommending system according to claim 18, wherein the content recommending device is configured to generate the user profile from user information received from the electronic device, the history information, and the real-time information.

20. The content recommending system according to claim 19, wherein the user information includes at least one of a name, ID, password, phone number, age, marital status, existence of a child, and MAC address of a user.

* * * * *